(12) United States Patent
Lee et al.

(10) Patent No.: US 12,337,478 B2
(45) Date of Patent: Jun. 24, 2025

(54) METHOD, COMPUTER SYSTEM, AND NON-TRANSITORY COMPUTER-READABLE RECORD MEDIUM FOR LEARNING ROBOT SKILL

(71) Applicant: NAVER CORPORATION, Seongnam-si (KR)

(72) Inventors: Taeyoon Lee, Seongnam-si (KR); Choongin Lee, Seongnam-si (KR); Changwoo Park, Seongnam-si (KR); Keunjun Choi, Seongnam-si (KR); Donghyun Sung, Seongnam-si (KR); Kyoungyeon Choi, Seongnam-si (KR); Younghyo Park, Seongnam-si (KR); Seunghun Jeon, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 0 days.

(21) Appl. No.: 18/884,894

(22) Filed: Sep. 13, 2024

(65) Prior Publication Data
US 2025/0010466 A1    Jan. 9, 2025

Related U.S. Application Data

(63) Continuation of application No. PCT/KR2023/002997, filed on Mar. 6, 2023.

(30) Foreign Application Priority Data

Mar. 15, 2022   (KR) .................. 10-2022-0031883
Apr. 11, 2022   (KR) .................. 10-2022-0044696

(51) Int. Cl.
*B25J 9/16*    (2006.01)
*B25J 11/00*   (2006.01)

(52) U.S. Cl.
CPC ............ *B25J 9/163* (2013.01); *B25J 9/1661* (2013.01); *B25J 9/1669* (2013.01); *B25J 9/1679* (2013.01);
(Continued)

(58) Field of Classification Search
CPC . B25J 9/0081; B25J 9/161; B25J 9/163; B25J 1/1633; B25J 1/1669; B25J 1/1679;
(Continued)

(56) References Cited

U.S. PATENT DOCUMENTS

2020/0030971 A1*   1/2020   Oleynik ..................... B25J 3/04
2021/0031358 A1*   2/2021   Sakaino ..................... B25J 3/00

FOREIGN PATENT DOCUMENTS

KR    10-2011-0015764 A    2/2011
KR    10-2015-0038896 A    4/2015
(Continued)

OTHER PUBLICATIONS

Korean Intellectual Property Written Decision for KR Applicaiotn No. 10-2022-0044696 dated Mar. 21, 2024.

*Primary Examiner* — Spencer D Patton
(74) *Attorney, Agent, or Firm* — Harness, Dickey & Pierce, P.L.C.

(57) ABSTRACT

Example embodiments are directed to a robotic painting method performed using a computer system. The computer system comprises at least one processor configured to execute computer-readable instructions included in a memory. The robotic painting method include collecting, by the at least one processor, stroke-level action data for a painting action; and learning, by the at least one processor, a stroke-level robotic painting skill using the stroke-level action data.

20 Claims, 15 Drawing Sheets

(52) U.S. Cl.
CPC ......... *B25J 9/1697* (2013.01); *B25J 11/0075* (2013.01); *B25J 9/161* (2013.01)

(58) Field of Classification Search
CPC ........ B25J 1/1684; B25J 11/0075; B25J 3/00; B25J 3/04
See application file for complete search history.

(56) References Cited

FOREIGN PATENT DOCUMENTS

| | | | |
|---|---|---|---|
| KR | 10-2018-0047391 | A | 5/2018 |
| KR | 10-2020-0059465 | A | 5/2020 |
| KR | 10-2020-0072592 | A | 6/2020 |
| KR | 10-2022-0015132 | A | 2/2022 |

* cited by examiner

Algorithm 1: Two-Stage Skill Learning
---
Input : Offline trajectory dataset $\mathcal{D}_{\tau,W}$
// First stage learning
Initialize the parameters, $\theta_\pi, \theta_f, \phi, \psi_{cVAE}$
while *not converged* do
    Sample $(\tau^k, s_g^k, s_i^k) \sim \mathcal{D}_{\tau,W}$
    Sample $z^k \sim q_\phi(\cdot | \tau^k, s_g^k, s_i^k)$
    Update the model parameters by descending the
    batched cVAE loss $\mathcal{J}_{cVAE}$ (9)
end
// Second stage learning
Freeze $\theta_\pi, \theta_f, \phi$, and initialize the parameters $\psi_{flow}$
while *not converged* do
    Sample $(\tau^k, s_g^k, s_i^k) \sim \mathcal{D}_{\tau,W}$
    Sample $z^k \sim q_\phi(\cdot | \tau^k, s_g^k s_i^k)$
    Compute inverse mapping of the conditional flow
    model, $u^k = h^{-1}_{\psi_{flow}}(z^k; s_i^k)$ and its volume
    distortion $v^k = \left| \det \left( \frac{\partial}{\partial z} h^{-1}_{\psi_{flow}}(z^k; s_i^k) \right) \right|$
    Evaluate the densities, $\log p_{\psi_{flow}}(z^k | s_i^k)$
    $= \log p_0(u^k) + \log v^k$
    Update $\psi_{flow}$ by descending the negative
    loglikelihood loss (11)
end
Output: $\theta_\pi, \theta_f, \phi, \psi_{flow}$

Algorithm 2: Online Skill Planning: MPPI

Input: skill-policy, dynamics, prior: $\pi_{\theta_\pi}, f_{\theta_f}, h_\psi$,
  $H = 40, N = 2000, u_{\max} = 1$
Given: initial state $s_0$, and reward function $R(s, z)$
Initialize input $u_t^*, t = 1, \cdots, H-1$
while *not done* do
  $t \leftarrow 0$ and $s_0^k \leftarrow s_t$ for $k = 1, \cdots, N$
  // simulate $N$ trajectories
  for $t = 0 : H-1$ do
    for $k = 0 : N$ do in parallel
      Sample $N$ skills:
      $u_t^k \sim \text{Uniform}(-u_{\max}, u_{\max})$ Predict next
      states and evaluate the rewards:
      $s_{(t+1)W}^k = f_{\theta_f}(s_{tW}^k, z_t^k)$,
      $R_t^k = R(s_{tW}^k, z_t^k)$
    end
  end
  Update optimal state-skill trajectory
  $\{s_{tW}^*, u_t^*\}_t \leftarrow \text{MPPI}(\{s_{tW}^k, u_t^k, R_t^k\}_{t,k})$
  $z_0^* = h_\psi(u_0^*; s_0^*)$
  for $t = 0 : W$ do
    Select action using skill-policy,
    $a_t = \pi_{\theta_\pi}(s_t, s_W, z_0^*)$
    Update next state from environment
  end
end

Algorithm 3: Offline Skill Planning: Offline RL

Input: Offline dataset $\mathcal{D}_{\tau,W}$, skill-policy, dynamics, prior: $\pi_{\theta_u}, f_{\theta_f}, p_{\psi_{\text{flow}}}, \gamma = 0.96, u_{\max} = 1$
Given: Reward function $R(s, z)$
Initialize replay buffer $\mathcal{D} = \varnothing$, policy $\pi_{\theta_u}$
while *not done* do
    // Sample from offline dataset
    Sample $H$ consecutive trajectories,
    $(\tau^k, s_g^k, s_1^k)_{k=1}^H \sim \mathcal{D}_{\tau,W}$
    Sample $z^k \sim q_\phi(\cdot | \tau^k, s_g^k s_1^k)$, for $k = 1, \cdots, H$
    Compute inverse mapping $u^k = h_\psi^{-1}(z^k; s_1^k)$ and
      reward $R^k = R(s_1^k, z^k)$, for $k = 1, \cdots, H$
    $\mathcal{D} \leftarrow \mathcal{D} \cup (s_1^k, s_g^k, u^k, R^k)_{k=1}^H$
    if *goal-conditioned* then
        $\mathcal{D} \leftarrow \mathcal{D} \cup \text{HER}((s_1^k, s_g^k, u^k, R^k)_{k=1}^H)$
    end
    // Sample model-based rollouts
    $\bar{s}_1^1 = s_1^1$
    for $t = 0 : N_m - 1$ do
        Sample base skill, $\bar{u}^t \sim \pi_{\theta_u}(\bar{s}_1^t)$
        Clamp $\bar{u}^t \leftarrow u_{\max} \cdot \text{Tanh}(\bar{u}^t)$
        Compute forward mapping $\bar{z}^t = h_\psi(\bar{u}^t; \bar{s}_1^t)$
        Predict next state $\bar{s}_1^{t+1} = f_{\theta_f}(\bar{s}_1^t, \bar{z}^t)$, and
          evaluate reward $\bar{R}^t = R(\bar{s}_1^t, \bar{z}^t)$
    end
    $\mathcal{D} \leftarrow \mathcal{D} \cup (\bar{s}_1^k, \bar{s}_g^k, \bar{u}^k, \bar{R}^k)_{k=1}^{N_m}$
    if *goal-conditioned* then
        $\mathcal{D} \leftarrow \mathcal{D} \cup \text{HER}((\bar{s}_1^k, \bar{s}_g^k, \bar{u}^k, \bar{R}^k)_{k=1}^{N_m})$
    end
    Update $\pi_{\theta_u} \leftarrow \text{SAC}(\theta_u, \mathcal{D})$
end
Output: $\pi_{\theta_u}$

METHOD, COMPUTER SYSTEM, AND NON-TRANSITORY COMPUTER-READABLE RECORD MEDIUM FOR LEARNING ROBOT SKILL

CROSS-REFERENCE TO RELATED APPLICATION(S)

This U.S. non-provisional application is continuation application of and claims priority under 35 U.S.C. § 120 to International Application No. PCT/KR2023/002997, filed Mar. 6, 2023. This U.S. non-provisional application also claims priority under 35 U.S.C. § 119 to Korean Patent Application No. 10-2022-0031883, filed Mar. 15, 2022, and Korean Patent Application No. 10-2022-0044696, filed Apr. 11, 2022. The entire contents of all these applications are incorporated herein by reference.

BACKGROUND

Some example embodiments relate to technology for learning a robot skill.

In general, a robot is an industrial robot, such as a manipulator or a transfer robot, for automating/unmanning a work at a production site, and performs a hazardous task, a simple repetitive task, or a task that is beyond the physical limitations of a human.

Currently, research and development of a humanoid robot that has a joint system similar to that of a human and provides a variety of services while coexisting with humans in a human work and life space is actively ongoing.

This humanoid robot performs a task using a manipulator that is designed to move close to (e.g., resemble) a movement of an arm or a hand by electrical/mechanical mechanism.

Most manipulators currently in use are configured through interconnection between a plurality of links. A connecting portion between the respective links is called a joint and an exercise characteristic of a corresponding manipulator is determined by geometric relationship between the links.

Kinematics is a branch of mathematics for describing this geometric relationship and most manipulators move a robot tip (i.e., end effector) in a direction (target point) for performing a task with this kinematic characteristic.

In order for the manipulator to perform a given task (e.g., task of grabbing an object), it is important to generate a series of operations performed by the manipulator from an initial position (starting point) before the manipulator performs the task to a final position (target point) at which the manipulator may perform the task, that is, may grab the object.

SUMMARY

Example embodiments may provide a pipeline for practical data-driven robot skill learning and planning that may solve a dynamic manipulation task entirely from offline remote control play data.

Some example embodiments may provide a data-based skill learning and planning approach to solve a complex robotic painting task in the real world.

Some example embodiments may provide robot skill learning technology that may alleviate (or minimize or reduce) a difference between a simulated robotic painting task and a real-world robotic painting task.

According to example embodiments, a robot skill learning method is performed by a computer system. The computer system includes at least one processor configured to execute computer-readable instructions included in a memory. The robot skill learning method includes collecting, using the at least one processor, action data of a robot using a haptic device; and learning, using the at least one processor, a robot skill using the action data.

According to example embodiments, the collecting may include collecting the action data by operating the robot based on physical force and a position command that constitute a manipulation action through the haptic device.

According to example embodiments, the collecting may include collecting action data of the robot as an unlabeled offline dataset.

According to example embodiments, the learning may include training a robot skill model that includes action sequence performance ability and outcome state prediction ability using the action data.

According to example embodiments, the learning may include training a skill-policy model related to an action sequence of the robot, a skill-dynamics model related to goal state prediction, and/or a skill-prior probability model related to skill distribution using the action data.

According to example embodiments, the learning may include training a robot skill model through two-stage conditional generative modeling, and may include reducing a dimension of a skill using a conditional variational auto-encoder (cVAE); and learning state-conditional distribution of skills by performing generative skill learning.

According to example embodiments, the learning of the state-conditional distribution may include learning the state-conditional distribution of skills according to an objective function that minimizes or reduces a difference between a prior probability skill and a posterior probability skill with a skill reconstruction loss.

According to example embodiments, the robot skill learning method may further include performing, by the at least one processor, model-based skill planning that constructs a skill-level policy by combining the learned skills for a given downstream task.

According to example embodiments, a robot skill learning method is performed by a computer system that includes at least one processor configured to execute computer-readable instructions included in a memory. The robot skill learning method includes collecting, by the at least one processor, stroke-level action data for a painting action; and learning, by the at least one processor, a stroke-level robotic painting skill using the stroke-level action data.

According to example embodiments, the collecting may include collecting the stroke-level action data by operating a robot based on a physical force and a position command that constitute a stroke-level action using a haptic device.

According to example embodiments, the collecting may include collecting action data of a master robot synchronized with a slave robot as an unlabeled offline dataset according to a stroke demonstration using the slave robot.

According to example embodiments, a unit skill for robotic painting may include an initial robot state, a stroke action trajectory, and an outcome stroke image.

According to example embodiments, the learning may include training a robot skill model that includes action sequence performance ability and outcome state prediction ability using the stroke-level action data.

According to example embodiments, the image transition model may be configured through an outcome stroke image model and a pixel-level color blending model.

According to example embodiments, the learning may include planning a painting skill sequence with a stroke-level skill combination through gradient-based trajectory optimization.

According to example embodiments, the learning may include training a deep latent variable model that encodes a state-action trajectory and an outcome stroke image each with a variable length using the action data.

According to example embodiments, the robot skill learning method may further include performing, by the at least one processor, a painting task for a target image based on the state-action trajectory and the outcome stroke image predicted through the deep latent variable model using a given or desired target image.

According to example embodiments, a non-transitory computer-readable recording medium stores instructions that, when executed by a processor, cause the processor to perform the robotic painting method.

According to example embodiments, a computer system includes at least one processor configured to execute computer-readable instructions included in a memory communicably coupled to the at least one processor. The at least one processor is configured to collect action data of a robot using a haptic device; and learn a robot skill using the action data.

According to example embodiments, a computer system including at least one processor configured to execute computer-readable instructions included in a memory communicably coupled to the at least one processor. The at least one processor is configured to collect stroke-level action data for painting action; and learn a stroke-level robotic painting skill using the action data.

According to some example embodiments, reduce data collection cost for robot skill learning by using unlabeled action data for robot skill learning.

According to some example embodiments, a robot skill model may be built more effectively and safely by learning and planning reusable and predictable robot skills from offline action data that may involve complex interaction with various external environments.

According to some example embodiments, various robotic painting skills may be realized or learnt using a haptic device.

According to some example embodiments, a difference between a desired image and a target image by learning a robotic painting skill based on data.

According to some example embodiments, a difference between simulated robotic painting and real-world robotic painting may be reduced through mapping that converts a painting skill into a stroke-level action a robot may execute.

BRIEF DESCRIPTION OF DRAWINGS

The above and other aspects, features and other advantages of the example embodiments will be more clearly understood from the following detailed description, taken in conjunction with the accompanying drawings.

FIG. 6 illustrates an example of a two-stage skill learning algorithm, according to some example embodiments.

FIG. 9 illustrates an example of an online skill planning algorithm using a model predictive path integral (MPPI), according to some example embodiments.

FIG. 10 illustrates an example of an offline skill planning algorithm using reinforcement learning (RL), according to some example embodiments.

DETAILED DESCRIPTION

Figure 1:
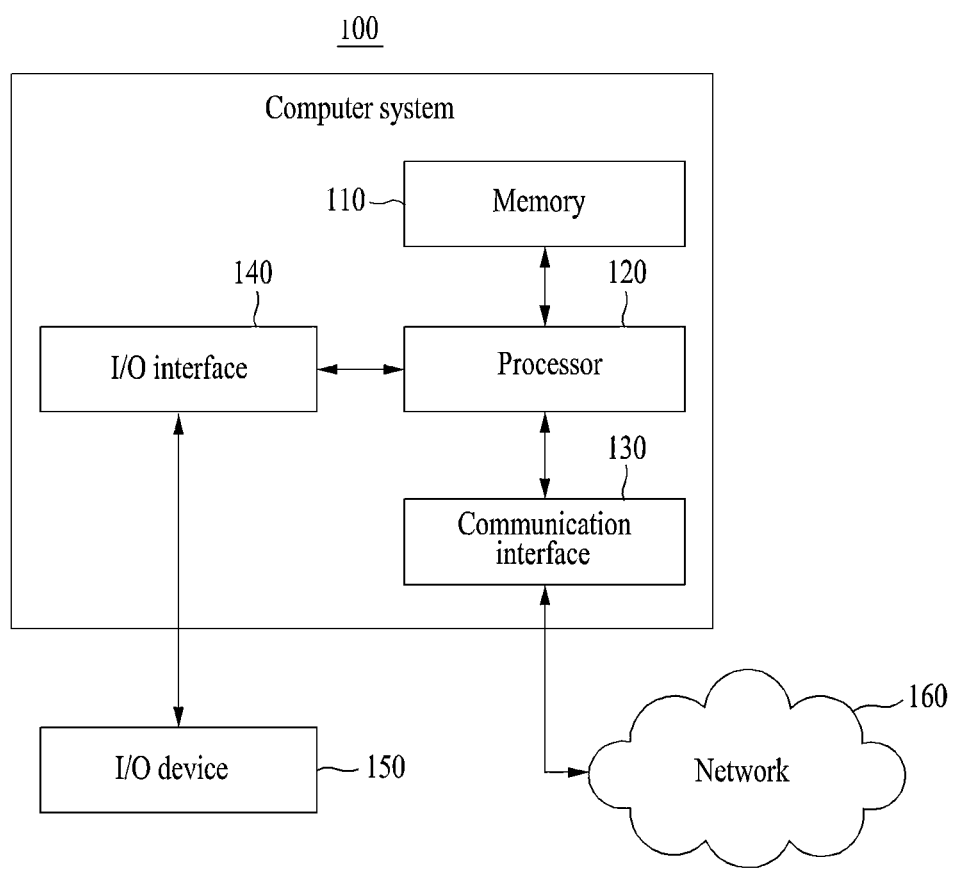
FIG. 1 illustrates an example computer system, according to some example embodiments.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Thus, for example, both "at least one of A, B, or C" and "at least one of A, B, and C" mean either A, B, C or any combination thereof. Likewise, A and/or B means A, B, or A and B. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for learning and planning a robot skill. The example embodiments as disclosed herein may learn and plan a reusable and predictable practical robot skill using offline data. Also, example embodiments may be directed to automating robotic painting tasks through stroke-level skill learning and optimal combination planning.

FIG. 1 is a block diagram illustrating an example of a computer system according to some example embodiments. For example, a robot skill learning system according to example embodiments may be implemented by a computer system 100 of FIG. 1.

Referring to FIG. 1, the computer system 100 may include a memory 110, a processor 120, a communication interface 130, and an input/output (I/O) interface 140 as components to execute a robot skill learning method according to some example embodiments. The computer system 100 may be, for example, a personal computer (PC), a notebook computer (laptop computer), a laptop computer, a tablet, an Internet of things (IoT) device, and or a wearable computer.

The memory 110 may include a storage device, such as a random access memory (RAM), a read only memory (ROM), and a disk drive, as a non-transitory computer-readable recording medium. Also, an OS and at least one program code may be stored in the memory 110. Such software components may be loaded to the memory 110 from another non-transitory computer-readable recording medium separate from the memory 110. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 110 through the communication interface 130, instead of the non-transitory computer-readable recording medium. For example, the software components may be loaded to the memory 110 of the computer system 100 based on a computer program installed by files received over the network 160.

The processor 120 may be configured to process instructions of a computer program by performing basic arithmetic operations, logic operations, and I/O operations. The computer-readable instructions may be provided by the memory 110 or the communication interface 130 to the processor 120. For example, the processor 120 may be configured to execute received instructions in response to a program code stored in a storage device, such as the memory 110.

The communication interface 130 may provide a function for communication between the computer system 100 and another apparatus over the network 160. For example, the processor 120 of the computer system 100 may forward a request or an instruction created based on a program code stored in the storage device such as the memory 110, data, and a file, to other apparatuses over the network 160 under control of the communication interface 130. Inversely, a signal, an instruction, data, a file, etc., from another apparatus may be received at the computer system 100 through the communication interface 130 of the computer system 100. For example, a signal, an instruction, data, etc., received through the communication interface 130 may be forwarded to the processor 120 or the memory 110, and a file, etc., may be stored in a storage medium, for example, the permanent storage device, further includable in the computer system 100.

The communication type is not limited and may include a near field wireless communication between devices as well as a communication using a communication network (e.g., a mobile communication network, wired Internet, wireless Internet, and a broadcasting network) includable in the network 160. For example, the network 160 may include at least one of network topologies that include a personal area network (PAN), a local area network (LAN), a campus area network (CAN), a metropolitan area network (MAN), a wide area network (WAN), a broadband network (BBN), and the Internet. Also, the network 160 may include at least one of network topologies that include a bus network, a star network, a ring network, a mesh network, a star-bus network, a tree or hierarchical network, and the like. However, they are provided as examples only.

The I/O interface 140 may be used for interfacing with an I/O device 150. For example, an I/O device 150 may include an input device, such as a microphone, a keyboard, a camera, a mouse, etc., and/or an output device, such as a display, a speaker, etc. As another example, the I/O interface 140 may be configured for interfacing with an apparatus in which an input function and an output function are integrated into a single function, such as a touchscreen. The I/O device 150 may be configured as a single apparatus with the computer system 100.

Also, according to other example embodiments, the computer system 100 may include a greater or smaller number of components than the number of components of FIG. 1. For example, the computer system 100 may be configured to include at least a portion of the I/O device 150 or may further include other components, such as a transceiver, a camera, a variety of sensors, and a database.

Currently, many methodologies are required to learn reusable skills from action data of a robot and to perform planning for a given task based on a hierarchical structure. Data collection cost, planning efficiency, and actual mission performance ability may vary depending on a method of collecting data, a method of defining a unit skill, and a learning method. Also, since it involves a repetitive and sometimes time consuming work to find a model that performs well in an actual robot, issues, such as data efficiency and safety, may be encountered in actual application. Existing methods are verified through a simulation environment, or may be applied to a real robot with limited motion.

Example embodiments may provide an offline skill learning framework that may solve a dynamic robot manipulation task and may also be applied in a real environment. Initially, an interactive remote control system may be used to generate the extensive collection of unlabeled, agile, and force-controlled manipulative movements. This offline trajectory database may be used to jointly learn 1) a state-conditional latent skill distribution, 2) a skill decoder network in a form of a goal-conditioned policy, and/or 3) skill-conditioned state transition dynamics through a two-stage generative modeling framework. Then, a given (or assigned) downstream task may be solved at a test time by performing a model-based plan (e.g., model predictive control (MPC), model-based offline reinforcement learning (RL), etc.).

Example embodiments relate to technology for building a method of defining learnable stroke-level robot skills and combining a plurality of strokes and a system for automating data-based robotic painting tasks based on the method. Example embodiments relate to a data-based skill learning approach that may minimize a gap between a simulated robotic painting task and a real-world robotic painting task. A robot, programmed using the example embodiments disclosed herein, may learn a stroke-level skill of jointly encoding task trajectory and painting results based on the collection of human demonstrations.

Figure 2:
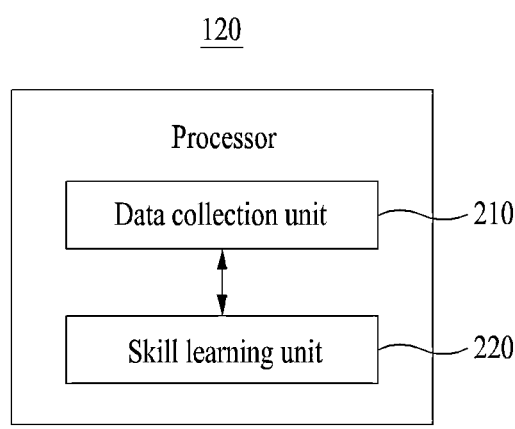
FIG. 2 illustrates components of a processor of a computer system of FIG. 1, according to some example embodiments.

FIG. 2 is a diagram illustrating different functions of the processor 120 in the computer system 100, according to some example embodiments.

Referring to FIG. 2, the processor 120 may include a data collection unit 210 and a skill learning unit 220. Components of the processor 120 may be representations of different functions performed by the processor 120 in response to a control instruction provided by at least one program code. For example, the data collection unit 210 may be used as a functional representation for the processor 120 that controls the computer system 100 to collect offline data required for robot skill learning.

Figure 3:
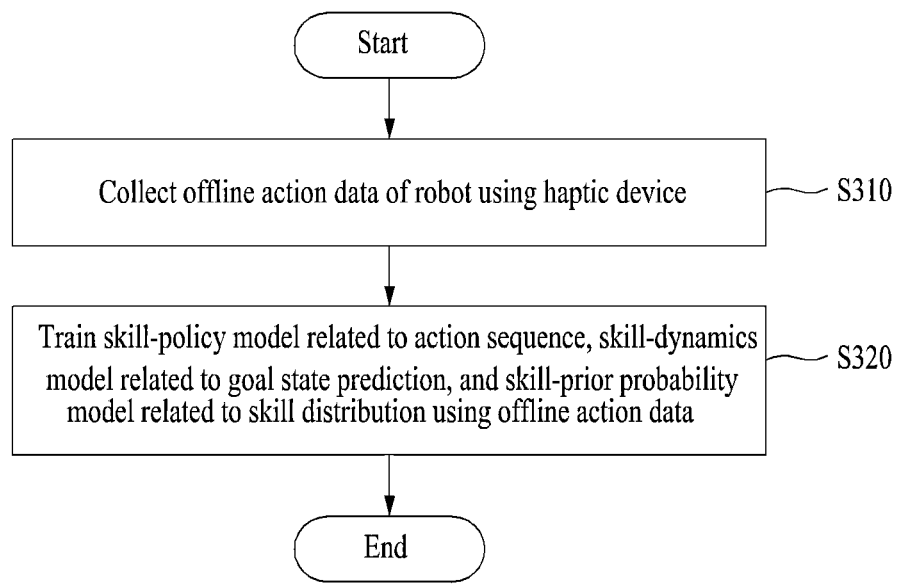
FIG. 3 is a flowchart illustrating a robot skill learning method, according to some example embodiments.
Figure 11:
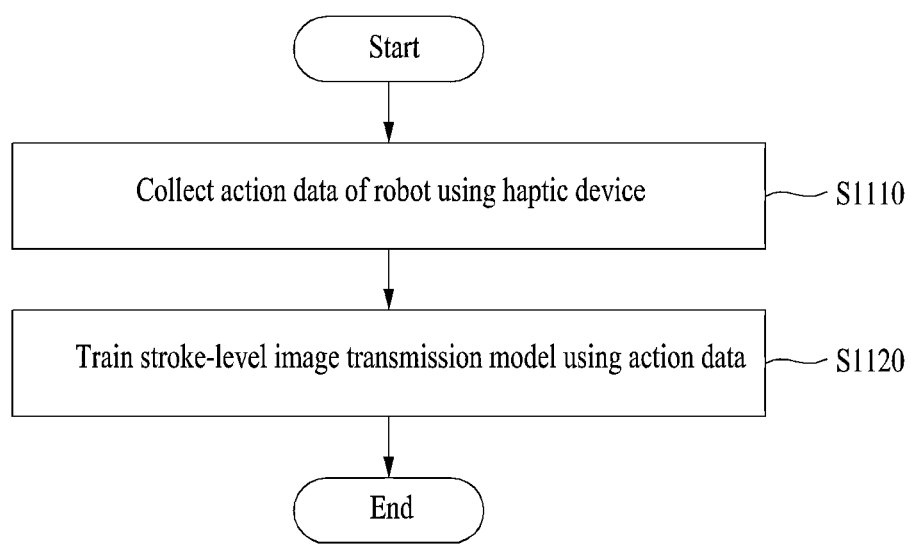
FIG. 11 is a flowchart of a robot skill learning method for robotic painting, according to some example embodiments.

The processor 120 and the components of the processor 120 may perform operations related to a robot skill learning method of FIGS. 3 and 11. For example, the processor 120 and the data collection unit 210 and skill learning unit 220 of the processor 120 may be configured to execute instructions according to at least one program code and a code of an OS included in the memory 110. Here, the at least one program code may correspond to a code of a program implemented to perform a robot skill learning method.

It is understood that additional operations can be provided before, during, and after the operations in the robot skill learning method, and some of the operations of the robot skill learning method can be replaced or eliminated, for additional embodiments of the method. The order of the operations/processes may be interchangeable, or two or more operations can be performed simultaneously.

The processor 120 may load, to the memory 110, a program code stored in a program file for the robot skill learning method. For example, the program file for the robot skill learning method may be stored in a storage device (e.g., a hard disk) that is separate from the memory 110, and the processor 120 may configure the computer system 100 such that the program code may be loaded from the program file stored in the storage device to the memory 110 through a bus. Here, the processor 120 and the data collection unit 210 and the skill learning unit 220 included in the processor 120 may be different functional representations of the processor 120 for performing the operations by executing an instruction of a corresponding part in the program code loaded to the memory 110. For execution of operations, the processor 120 and the components of the processor 120 may process an operation according to a control instruction or may control the computer system 100.

FIG. 3 is a flowchart illustrating a robot skill learning method that may be performed by a computer system, according to some example embodiments.

Referring to FIG. 3, in operation S310, the data collection unit 210 may collect offline action data that involves complex interaction with various external environments using a haptic device. Here, since the action data may not be specific to a particular action is represented or to a task being performed, data collection cost is greatly reduced. Also, the example embodiment describes that robot action data for learning is collected using a haptic device, but is not limited thereto. For example, to reduce the data collection cost, any method that allows a robot to safely collect data on its own (e.g., autonomously) may be applied.

A skill for learning may be defined as an ability to perform a skill that a robot may perform in an arbitrary state as an action sequence in an infinite time, and ability to predict an outcome state by the skill.

In operation S320, the skill learning unit 220 may train a skill-policy model related to an action sequence, a skill-dynamics model related to goal state prediction, and/or a skill-prior probability model related to skill distribution through a two-stage conditional generative modeling framework using the offline action data. The skill-policy model may include finite-horizon goal-conditioned action trajectories, the skill-dynamics model may include a skill-conditional state transition, and the skill-prior probability model may include a state-conditional latent skill distribution. The skill learning unit 220 may learn the state-conditional latent skill distribution that jointly encodes the goal-conditioned action trajectories and the skill-conditional state transition.

The skill learning unit 220 may train the robot skill model that simultaneously (or near simultaneously) satisfies the action trajectory performance ability and the outcome state prediction ability by training the skill-policy model, the skill-dynamics model and the skill-prior probability model using the offline action data. Most methods for learning robot skills have difficulty in directly finding an indicator related to how well a skill is learned, that is, how well the skill reflects data and also have difficulty in efficiently performing or generating a skill. Difficulty in knowing a consistent indicator of a trained skill model represents that it is difficult to tune performance based on a consistent standard and difficulty in efficiently performing/generating a skill represents that a task planning using the skill is difficult or inefficient in terms of calculation. The skill learning unit 220 may simultaneously solve the above two problems through a stage conditional generative modeling technique. By performing joint learning of the skill-dynamics model that predicts an outcome state reachable from an initial state, the skill learning unit 220 may perform real-time task planning using a method, such as model predictive control (MPC) for an arbitrarily given task and may also perform non-real-time task planning such as offline reinforcement learning (RL). The skill learning unit 220 may combine learned skills and may also learn a task plan through repetitive new experience such online reinforcement learning (RL).

Example embodiments are directed to extract a skill condition state transition model and a reusable generative skill from a relatively large unlabeled play dataset. At a test, these twin components may be used to perform a model-based plan for solving a given downstream task.

Initially, a discrete time Markov decision process (MDP) as infinite-horizon is defined as $M=(S,A,p,R,\gamma,\rho_0)$. For example, a problem that a robot performs a given task may be defined as MDP. Here, S denotes a continuous space of state and A denotes an action. $p(\cdot|s,a)$ denotes a state transition probability density for $s \in S$ and $a \in A$. $R: S \times A \to \mathbb{R}$ denotes a reward function, $\gamma \in (0,1)$ denotes a discount factor, and $\rho_0(\cdot)$ denotes initial state density. That is, S denotes a state that the robot faces, A denotes an action that the robot may take, p denotes a probability distribution for a next state that the robot reaches when the robot takes an action in a given state, and R denotes a reward function for a specific task.

Given an offline trajectory database $\mathcal{D} \triangleq \{(s_i, a_i)\}_{i=1}^N$ that includes continuous and diverse exercise actions, a goal is to learn a joint distribution $$p(\tau_{t,W}, s_{t+W} | s_t).$$

A state-action trajectory $\tau_t, W \triangleq \{(s_{t+k}, a_{t+k})\}_{k=0}^{W-1}$ and a goal state $s_t + W$ of fixed window size W are conditioned in an initial state $s_t$. To this end, an original dataset D is reordered in a sliding window of the entire trajectory as follows.

$$\mathcal{D}_{\tau,W} \triangleq \{s_t, a_t, \ldots, s_{t+W-1}, a_{t+W-1}, s_{t+W}\}_{t=1}^{N-W}$$

To simplify notation, samples extracted from the dataset $\mathcal{D}_\tau, W$ are labeled as in Equation 1.

$$s_i \leftarrow s_t, s_g \leftarrow s_{t+W} \text{ and } \tau \leftarrow \tau_{t,W} \quad \text{[Equation 1]}$$

Here, $s_i$ denotes an initial state, $s_g$ denotes a goal state, and $\tau$ denotes a state-action trajectory actually performed by the robot to reach the goal state $s_g$ from the initial state $s_i$.

A latent variable model as in Equation 2 is assumed for conditional distribution.

When the dataset $\mathcal{D}_\tau, W$ is given, a skill distribution defined as in Equation 2 is learned.

$$p(\tau, s_g | s_i) = \int_Z p(\tau | s_g, s_i, z) p(s_g | s_i, z) p(z | s_i) dz \quad \text{[Equation 2]}$$

$$= \int_Z \prod_{(s,a,s') \in \tau} \underbrace{\{\pi(a|s,s_g,z) p(s'|s,a)\}}_{\text{skill-policy}}$$

$$\underbrace{p(s_g|s_i,z)}_{\text{skill-dynamics}} \underbrace{p(z|s_i)}_{\text{skill-prior}} dz,$$

An instance extracted from the conditional distribution represents single realization of a skill.

While a latent variable $z \in Z$ derived from skill-prior probability distribution $p(z|s_i)$ represents a skill allowed in the initial state $s_i$, feedback skill-policy $\pi(a|s,s_g,z)$ for all $(s,a) \in \tau$ decodes an action sequence that achieves the goal state $s_g$ using a specific latent skill z. Finally, skill-dynamics may allow the robot to recognize the goal state $s_g$ in advance before executing the skill z in the initial state $s_i$.

Skill-policy represents a policy function for an action that the robot needs to implement to reach the goal state $s_g$ when encountering a random state s, skill-dynamics represents a dynamics function that predicts the goal state $s_g$ reached when selecting a specific skill in a skill space z abstracted for the initial state $s_i$, and skill-prior represents a prior probability function for distribution of skills that the robot may actually perform in the skill space z abstracted for the initial state $s_i$.

If skill-policy and skill-dynamics are capable of accurately reconstructing a state and an action of original MDP M, new skill level MDP $MZ=(S,Z,p_z,R_z,\gamma,\rho_0)$ may be defined for model-based planning of the skill space Z. Transition probability $p_z$ represents skill-$\mathbb{R}$ dynamics $p(s_t + W|s_t,z)$, and $R_z: S \times Z \to \mathbb{R}$ denotes a reward function defined for the state s and the latent skill z. Then, a final goal is to find the optimal skill level policy $\pi^*(z|s)$ that maximizes a cumulative reward to solve the given downstream task.

$$\max_{\pi^*, s_0 \sim \rho(\cdot)} \mathbb{E}\left[\sum_{k=0}^{\infty} \gamma^k R(s_k, W, z_k) | s_0\right] \quad \text{[Equation 3]}$$

Due to the repetitive model-based nature of skill definition, the duration of a unit skill may be temporarily extended while enabling model-based future state/trajectory prediction. That is, in state $s_0, z_0 \sim p(\cdot|s_0)$ may be sampled, $s_1 \sim p(\cdot|s_0,z_0)$ may be predicted, $z_1 \sim p(\cdot|s_1)$ may be sampled, and $s_2 \sim p(\cdot|s_1,z_1)$ may be predicted. That is, the MDP may be redefined as skill level by dividing the dataset $\mathcal{D}_\tau, W$ into unit skills.

Hereinafter, a method of jointly learning three components (skill-prior probability model, skill-policy model, and skill-dynamics model) specified in Equation 2 using offline dataset $D_\tau,w$ is further described.

Figure 4:
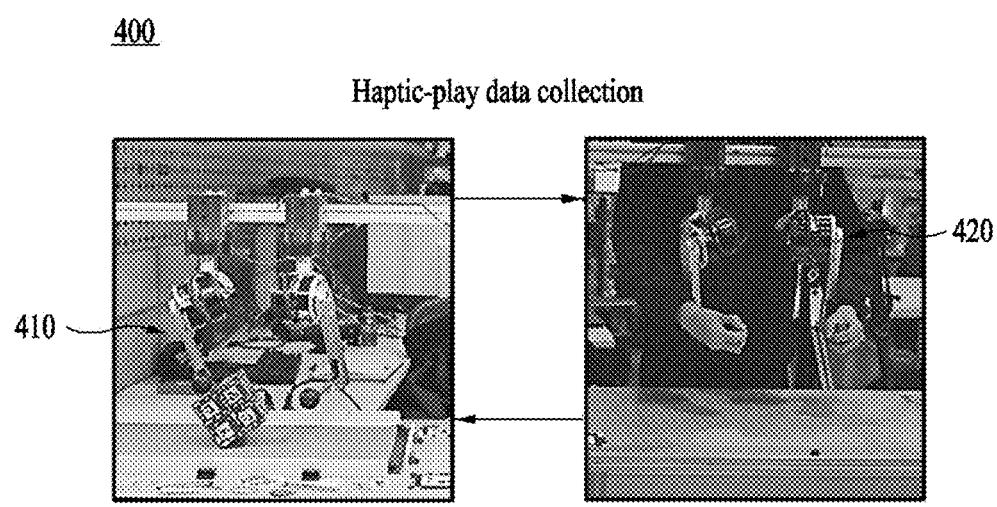
FIG. 4 illustrates an example of a process of collecting offline action data, according to some example embodiments.

FIG. 4 illustrates an example of a process of collecting offline action data, according to some example embodiments.

Referring to FIG. 4, the data collection unit 210 may use an interactive remote control system 400 to collect the wide range of forcibly controlled manipulation actions for offline skill learning. A set of two proprioceptive torque-controlled robots, master and slave, is synchronized using low latency and high-strength impedance control such that an operator may transmit a motion command and may also adjust a force through a master device due to physical force/haptic feedback. Providing haptic feedback information to the operator may expand the extent to which a dynamic and interactive action may be proved. The operator may directly demonstrate all of physical force and positional command that constitute a natural, agile, and skillful contact-rich manipulation action for a robot (slave) 410. Here, data labeling may not be required in a data collection operation. That is, the operator may not be requested to repeatedly generate a series of episode demonstrations for a specific task. The operator may operate the robot 410 through a haptic device 420 and continuously demonstrates various actions.

Figure 5:
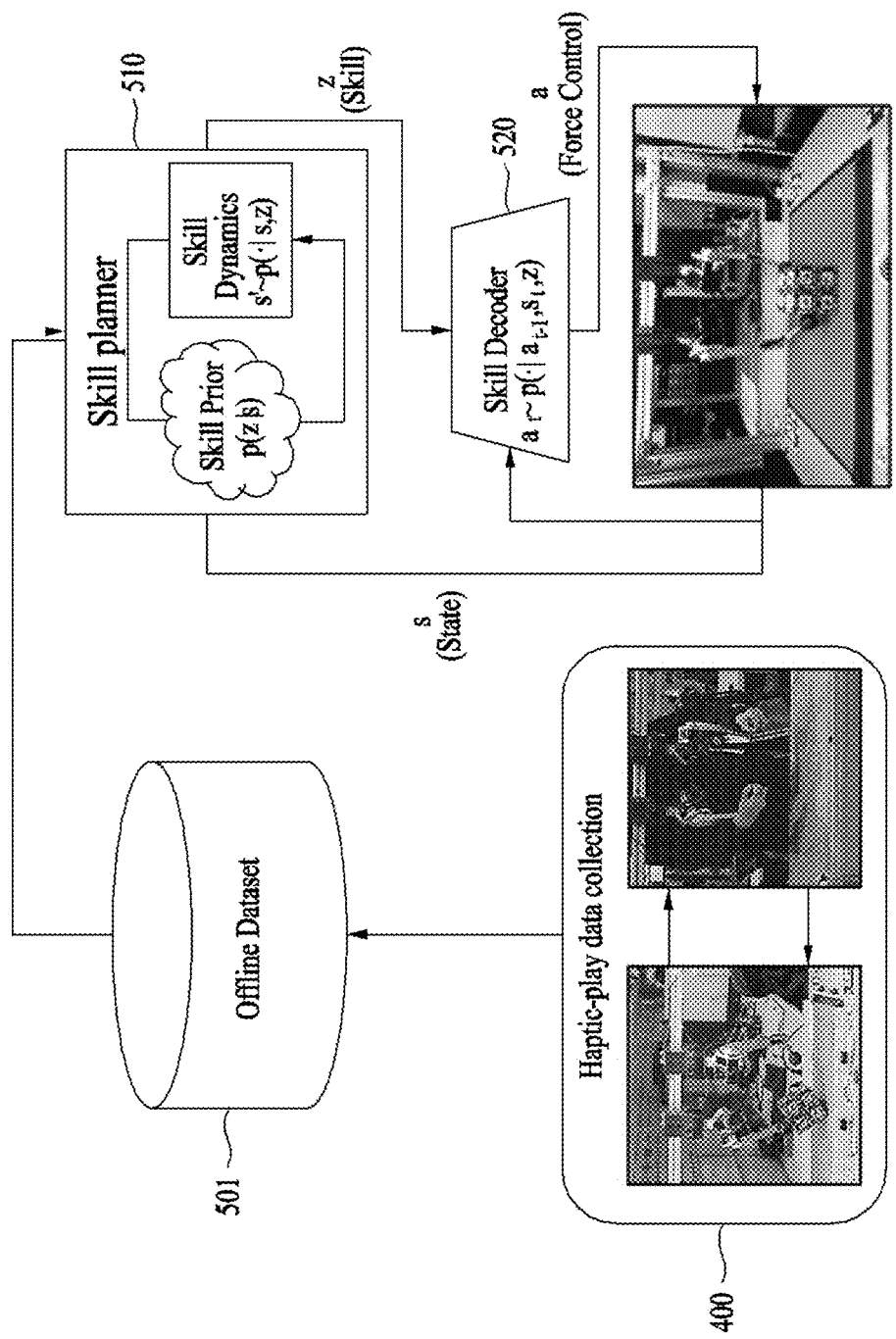
FIG. 5 illustrates an overall flow diagram of an offline skill learning framework, according to some example embodiments.

Referring to FIG. 5, the skill learning unit 220 may learn a skill planner 510 and a skill decoder 520 as components related to a robot skill by using an offline dataset 501 collected through the interactive remote control system 400 as learning data. Skill-prior probability included in the skill planner 510 may represent a network for distribution of skills that the robot may perform, skill-dynamics included in the skill planner 510 may represent a network for an outcome state reached when a skill is implemented, and the skill decoder 520 may represent a network that remaps a skill mapped in an abstract information space to a language understandable by the robot and interprets the same as a torque value the actual robot may output.

The skill learning problem may be formulated as follows.

When considering an offline trajectory dataset, a learning goal is to learn a state-conditional distribution $p(z|s_i)$ of skills that jointly realize feedback policy $\pi(a|s,s_g,z)$ and relevant outcome state (e.g., $s_g \sim p(s_g|s_i,z)$). Here, a condition generative skill learning problem is formulated as Equations 4 and 5 below.

$$\min_{\theta_\pi, \theta_f, \phi, \psi} \mathbb{E}_{\mathcal{D}_{\tau,W}} \left[ \mathbb{E}_{q_\phi(z|\tau,s_g,s_i)}[\mathcal{L}_{rec}] \right] \quad \text{[Equation 4]}$$

$$\text{s.t. } \hat{p}_{\mathcal{D},\phi}(\cdot \mid s_i) = p_\psi(\cdot \mid s_i), \text{ for all } s_i \in \mathcal{D}_{\tau,W} \quad \text{[Equation 5]}$$

Here, $q_\phi(z|\tau,s_g,s_i)$ represents skill posterior probability.

That is, a skill learning process requires a dimension reduction function of mapping a skill to a low-dimensional abstract space and then restoring the mapped skill and also requires a process of learning a skill distribution. This is to match a skill distribution included in a dataset and a skill distribution to be learned as much as possible.

A skill reconstruction loss expressed as $\pi_{\theta_\pi}$ and $f_{\theta_f}$, which is a deterministic function of feedback policy and skill dynamics, may be defined as in Equation 6.

$$\mathcal{L}_{rec} \triangleq \sum_{(s,a) \in \tau} \left\| a - \pi_{\theta_\pi}(s, s_g, z) \right\|^2 + \left\| s_g - f_{\theta_f}(s_i, z) \right\|^2 \quad \text{[Equation 6]}$$

A state conditional aggregate skill posterior probability distribution may be defined as in Equation 7.

$$\hat{p}_{\mathcal{D},\phi}(z \mid s_i) \triangleq \mathbb{E}_{\tau,s_g \sim \mathcal{D}_{\tau,W}}[q_\phi(z \mid \tau, s_g, s_i)] \quad \text{[Equation 7]}$$

Equation 7 is similar to Wasserstein Auto-Encoder (WAE), and here, a goal is to minimize the reconstruction loss and, at the same time, to constrain an aggregate posterior probability to match a fixed prior probability. In particular, the conditional prior probability $p_\psi(z|s_i)$ may be jointly learned rather than fixed, which allows a set of allowable skills to be selectively generated depending on a robot state.

Meanwhile, a conditional variational autoencoder (cVAE) may be applied as a single standard for condition generation modeling. Each posterior probability may be normalized between the posterior probability and the prior probability by minimizing Kullback-Leibler (KL) divergence rather than directly enforcing the prior probability to match the aggregate posterior probability.

$$\mathcal{L}_{KL} = D_{KL}(q_\phi(\cdot \mid \tau, s_g, s_i) \| p_\psi(\cdot \mid s_i)). \quad \text{[Equation 8]}$$

An unconstrained objective function such as Equation 9 may be minimized.

$$\mathcal{J}_{cVAE} = \mathbb{E}_{\mathcal{D}_{\tau,W}} \left[ \mathbb{E}_{q_\phi(z|\tau,s_g,s_i)}[\mathcal{L}_{rec}] + \beta \mathcal{L}_{KL} \right] \quad \text{[Equation 9]}$$

Here, $\beta$ denotes a non-negative normalization factor that balances reconstruction loss against prior probability matching loss. If $\beta \gg 1$, the posterior probability is likely to inevitably collapse into the prior probability, resulting in poor reconstruction. On the contrary, if $\beta$ is set too small, an attempt is made to reconstruct only a skill sample extracted from the aggregate posterior probability distribution, whereas a significant portion of skills sampled from the prior probability $p_\psi(\cdot|s_i)$ are out-of-distribution skills to which low reconstruction quality is applied. Therefore, it is beneficial to set $\beta$ to an appropriate value.

Equations 4 and 5 based on WAE may directly minimize a difference $D(\cdot,\cdot)$ between a prior probability skill and a posterior probability skill with the reconstruction loss, thereby alleviating (or minimizing or reducing) many difficulties of VAE.

$$\mathcal{J}_{cWAE} = \mathbb{E}_{\mathcal{D}_{\tau,W}} \left[ \mathbb{E}_{q_\phi(z|\tau,s_g,s_i)}[\mathcal{L}_{rec}] \right] + \\ \lambda \mathbb{E}_{s_i \sim \mathcal{D}_{\tau,W}} \left[ D(\hat{p}_{\mathcal{D},\phi}(\cdot \mid s_i), p_\psi(\cdot \mid s_i)) \right] \quad \text{[Equation 10]}$$

Here, $\lambda$ denotes a penalty factor.

Since direct evaluation of distance D is intractable, the existing approaches typically depend on a sampled distance estimate, such as a generative adversarial network (GAN) and maximum mean discrepancy (MMD) loss. Herein, the distribution of source and target samples representing aggregate posterior probability and prior probability may be dynamically updated during a learning process.

A two-stage method for solving the optimization problem specified in Equations 4 and 5 may decompose a complex skill prior probability matching condition (Equation 5) in reconstruction minimization (Equation 4) to ensure that each optimization problem stably converges to an optimal state.

FIG. 6 illustrates an example of a two-stage skill learning algorithm according to some example embodiments.

Referring to FIG. 6, the skill learning unit 220 may reduce a dimension of an offline dataset using cVAE as a first process for robot skill learning. Initially, a cVAE goal (Equation 9) is minimized with a sufficiently small $\beta$ selection. This is to allow a low-dimensional embedding of skill sample z extracted from the aggregate posterior probability to affect the accurate reconstruction of an action sequence and a goal state. The reason of normalizing the posterior probability distribution while minimizing the KL loss ($\beta \sim 0.001$) without using an auto-encoder provided with a deterministic latent embedding is to limit or minimize target data distribution from being excessively complicated and to stabilize a maximum likelihood learning performed in stage 2.

The skill learning unit 220 may perform generative skill learning as a second process. The skill learning unit 220 may replace a conditional Gaussian skill prior probability model of first-stage cVAE learning with a sufficiently complex and flexible skill prior probability model $p_\psi(\cdot|s_i)$. In some example embodiments, the skill learning unit 220 may fit the generative skill distribution $p_\psi(\cdot|s_i)$ to the aggregated distribution $\hat{p}_{\mathcal{D},\phi}(\cdot|s_i)$ of the fixed skill posterior probability $q_\phi(\cdot|\tau,s_g,s_i)$ pre-learned through the maximum likelihood learning in the first stage.

$$\min_\psi \mathcal{J}_{ML} = \mathbb{E}_{\mathcal{D}_{\tau,W}}[\mathbb{E}_{q_\phi(z|\tau,s_g,s_i)}[-\log p_\psi(z|s_i)]] \quad \text{[Equation 11]}$$

It is similar to KL divergence minimization formula.

$$\mathcal{J}_{ML} = \mathbb{E}_{s_i \sim \mathcal{D}_{\tau,W}}[D_{KL}(\hat{p}_{\mathcal{D},\phi}(\cdot|s_i) \| p_\psi(z|s_i))] + \quad \text{[Equation 12]}$$
$$\underbrace{\mathbb{E}_{s_i \sim \mathcal{D}_{\tau,W}}[\mathcal{H}(\hat{p}_{\mathcal{D},\phi}(\cdot|s_i))]}_{\text{constant conditional entropy}}.$$

A flow-based model may be used for the above purpose. The flow-based model is a unique class of a deep generative model that may allow all of direct density evaluation and fast forward sampling through simple forward pass. That is, a second process of skill learning is to fine-tune a trained data distribution model and skill prior probability model using the flow-based model.

In the flow-based model, it may be assumed that sample z is generated through direct differential transformation $h_\psi$ of basic sample $u \sim p_0(\cdot)$, that is, $z = h_\psi(u;s)$. Here, the basic distribution $p_0$ may be generally set to standard normal distribution or uniform distribution. The density evaluation may be represented as $$p(z|s) = p_0(u)\left|\det\left(\frac{\partial}{\partial z}h_\psi^{-1}(z;s)\right)\right|.$$

Learning is very stable due to direct density evaluation in maximum likelihood learning. This corresponds to second-stage skill learning described in Algorithm 1 of FIG. 6.

In the example embodiment, there is an advantage that density evaluation and sampling may be simultaneously performed using the flow-based model in the skill learning process. The density evaluation calculation may indicate that an indicator of a difference between a data distribution and a model to be trained may be directly acquired and that the sampling is possible indicates that fast skill planning is possible.

The direct evaluation on a likelihood loss activated by the flow-based model may consistently estimate and compare the distribution matching quality between a plurality of instances of the model, which corresponds to substantial key content compared to other models such as a GAN.

Figure 7:
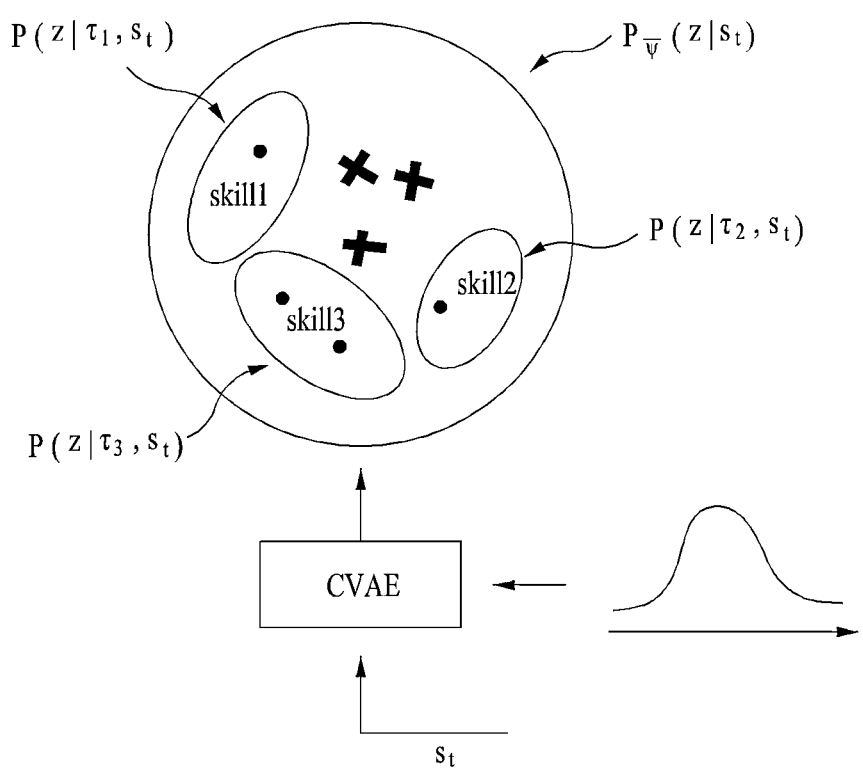
FIG. 7 illustrates an example of explaining a first skill learning process using a conditional variational autoencoder (cVAE), according to some example embodiments.
Figure 8:
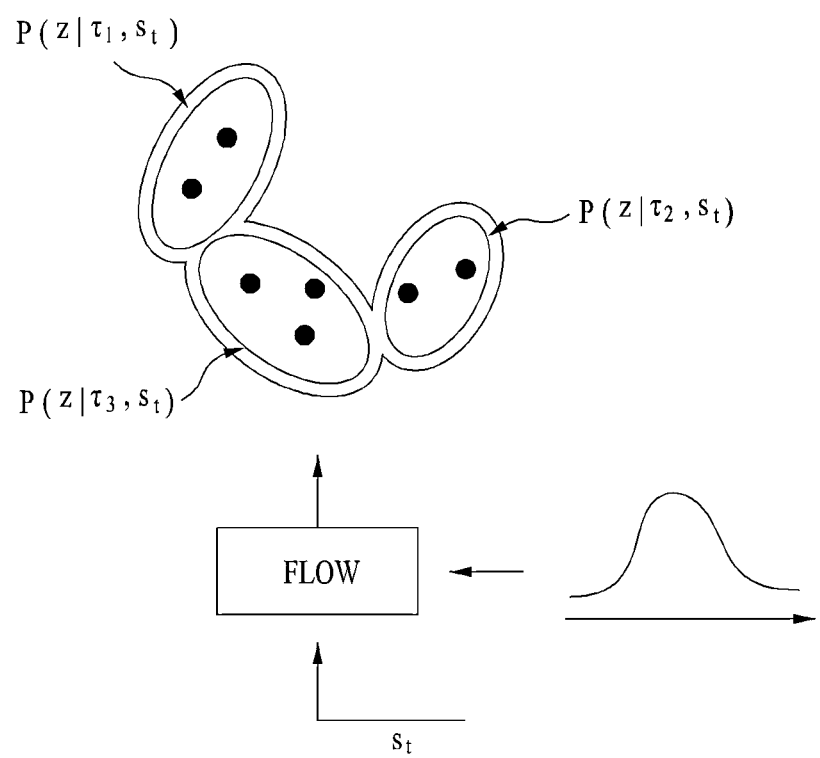
FIG. 8 illustrates an example of explaining a second skill learning process using a flow-based model, according to some example embodiments.

FIGS. 7 and 8 illustrate improvement in state condition prior probability matching performance from cVAE (first stage) to flow-based generative learning (second stage). A dot represents an in-distribution skill sample taken from the prior probability $p_\psi(\cdot|s_t)$ and a cross represents an out-of-distribution skill. As illustrated, when generating a skill in a trained conditional prior probability model, an amount of distribution matching or out-of-distribution sampling may be explicitly controlled, which has a close correlation to downstream task performance. In the example embodiment, real-time model-based planning and fast and parallel sampling are highly desirable and an Inverse Autoregressive Flow (IAF) network may be used to enable fast forward sampling.

The skill learning unit 220 may perform model-based skill planning and may aim to construct an optimal skill level policy $\pi^*(z|s)$ for an arbitrary downstream task (Equation 3) when learned skill-policy, skill-dynamics, and skill-prior network are given or predetermined. Here, two model-based planning methods, online MPC and offline model-based RL may be used.

A decision-making time computation of an online planning method such as MPC, that is, optimal feedback planning has an advantage over an offline planning method in that the given task may be directly executed without an additional learning process. The MPC may realize a suboptimal feedback plan by repeatedly solving a receding-horizon trajectory optimization problem at each stage. The nonlinear and high-dimensional nature of the trajectory optimization problem generally limits the use of MPC for a real-time application. For example, a model predictive path integral (MPPI) control that is one of nonlinear MPC algorithms may alleviate many difficulties by allowing fast and GPU-accelerated sampling-based computation of an optimal trajectory. Directly applying an MPPI algorithm in a learned skill space is the same as Algorithm 2 shown in FIG. 9.

Then, precomputation of optimal feedback planning may be appropriate when a relevant model requires relatively large computational cost or when the given task requires sufficiently sophisticated and long-horizon planning strategy that may be time consuming to compute in real time. The example embodiment particularly focuses on the offline planning method that no longer requires repetitive interaction with an environment. Offline RL precisely addresses a problem of extracting an optimal policy from a given fixed past experience dataset. Algorithm 3 shown in FIG. 10 includes a process in which a trained skill model uses RL algorithms, Soft ActorCritic (SAC) and hindsight experience replay (HER), together to process a goal-conditioned downstream task.

Using a trained skill prior probability model may alleviate a distribution shift problem by rejecting an out-of-distribution skill sample. In detail, a feedback policy $\pi_{\theta_u}(u|s)$ that shares the same support as a basic skill distribution $p_0$ is learned and skill z is retrieved through learned forward mapping $h_\psi$, that is, $u \sim \pi_{\theta_u}(\cdot|s)$. That is, $z = h_\psi(u_{max} \cdot \text{Tanh}(u); s)$. Other offline RL algorithms may also be applied to model-based and model-free settings in a similar manner. In general, a model-based method tends to work better than a model-free method with a limited dataset size and a sufficiently accurate model.

FIG. 11 is a flowchart illustrating another example of a robot skill learning method for robotic painting that a computer system may perform according to some example embodiments.

Referring to FIG. 11, in operation S1110, the data collection unit 210 may collect offline action data that involves complex interaction with various external environments using a haptic device. Here, since the action data may not indicate which action is represented or which task is being performed, data collection cost is reduced. Also, the example embodiment describes that robot action data for learning is collected using the haptic device, but is not limited thereto. For example, to reduce the data collection cost, a method that allows a robot to safely collect data on its own may be applied.

A skill for learning may be defined as follows: ability to perform a skill that the robot may perform in an arbitrary state in an action sequence with a variable length, and ability to predict an outcome state by the skill.

In this example embodiment, a unit skill may be defined as information contained in a motion of the robot that performs a single stroke, that is, information related to a single painting stroke. The unit skill may include 1) an initial robot state, 2) a stroke action trajectory, and 3) a painted outcome stroke image. The unit skill may be defined in a sub-task form having an explicit and variable length, called a single stroke.

When directly taught by a person using the haptic device or directly collected by the robot, the data collection unit 210 may recognize original data in a stroke level and may separate and store the same in a stroke level.

In operation S1120, the skill learning unit 220 may train a stroke-level image transition model using the offline action data. When data collected in operation S1110 is given, the skill learning unit 220 trains a deep latent variable model that encodes the joint distribution of state-action trajectories and an outcome stroke image.

The skill learning unit 220 may combine learning skills through model-based trajectory optimization in a stroke-level skill space and may perform model-based skill planning that constructs a skill-level policy. High-level stroke-based skill planning may be extracted by performing offline model-based policy/trajectory optimization (e.g., stroke-based rendering (SBR) algorithm) without performing an additional online interaction with a real environment.

In some example embodiments, since modeling of complex dynamics occurring in a contact interaction between the robot and the canvas may not be performed, work planning for a long-horizon mission such as a painting work may be facilitated. The skill learning unit 220 may configure a stroke-level image transition model as a model for skill combination. Here, the image transition model may be configured through a stroke image model and a pixel-level color blending model. For example, the skill learning unit 220 may perform the skill combination through gradient-based trajectory optimization. Depending on example embodiments, the skill learning unit 220 may perform the skill combination through a sampling-based optimal planning technique or a model-based optimal planning technique such as RL, in addition to the gradient-based trajectory optimization algorithm.

Given an arbitrary target image, the robot may execute hierarchical layers of an online feedback decision-making module, such as low-level force control, to realize 1) a stroke sequence inference based on a current canvas and a target image and 2) a high-level command of a target stroke.

Data-based skill learning approach is described as follows.

A robotic painting task may be formulated as a sequential decision-making problem with a goal of minimizing a difference between the current canvas image $I_t^{canvas}$ and the target image $I^{target}$ stage by stage.

$$\min_{\pi(a|I^{target}, I_t^{canvas})} d(I^{target}, I_N^{canvas}) \quad \text{[Equation 13]}$$
$$\text{s.t. } I_{t+1}^{canvas} = f(I_t^{canvas}, a), a \in \mathcal{A}$$

Here, f represents dynamics of a painting environment that updates the current canvas image $I_t^{canvas}$ in a canvas image stage in relation to decision variable $a \in \mathcal{A}$.

A stroke-based rendering (SBR) algorithm may solve the problem by defining the painting environment f by relying on a computer graphics rendering too. Also, to define the action space $\mathcal{A}$, painting strokes are minimized. For example, each item of a vector value a may represent another modeling selection of a single stroke, including path, width, style, opacity, and color. This action value may be accurately rendered on the current canvas image $I_t^{canvas}$ that simulates a future canvas image $I_{t+1}^{canvas}$ using a computer graphics rendering engine.

However, in a real-world robotic painting task, a modeling selection for feasible action space $\mathcal{A}$ and canvas transition dynamics f is not simple. The limited stroke range that the robot may accurately plan and control to render on a physical canvas fundamentally limits the feasible action range. The robotic painting task may be reconfigured as a hierarchical decision-making and control problem.

$$\min_{\pi(z|I^{target}, I_t^{canvas})} d(I^{target}, I_N^{canvas}) \quad \text{[Equation 14]}$$
$$\text{s.t. } I_{t+1}^{canvas} = f(I_t^{canvas}, z), z \in \mathcal{Z},$$
$$\tau^{robot} = g(z),$$

Here, a stroke level decision variable $z \in \mathcal{Z}$ that represents a skill embedding space may encode enough information to generate a low-level command of a robot action trajectory $\tau^{robot}$ required to update the current canvas image $I_t^{canvas}$ and also accurately render a desired stroke on a current canvas.

The highly complex and stochastic nature of a real-world painting environment makes it challenging to find an associated robot planning and control problem, that is, mapping g. Also, considering the long-horizon nature of a painting task, which may require hours of robot actions to draw a delicate work of art, the requirements to accurately render a selected robot action to the future canvas image $I_{t+1}^{canvas}$ is difficult.

In the following, $\mathcal{Z}$ is referred to as a robotic painting skill (RPS) space. Herein, data-based learning of RPS may greatly alleviate the problems aforementioned in relation to the robotic painting task. Example embodiments are directed to learning the joint distribution of robot action trajectories and outcome images related to all strokes.

$$p(\tau^{robot}, I^{stroke}) = \mathbb{E}_{z \sim p_z(\cdot)}[p(\tau^{robot}|z)p(I^{stroke}|z)] \quad \text{[Equation 15]}$$

It may be implemented using a wide range of human demonstration datasets in a real environment. Here, $p_z: \mathcal{Z} \to \mathbb{R}$ serves to define the feasible robotic painting skill space $\mathcal{Z}$, and $p(\tau^{robot}|z)$ decodes a latent skill expression z with a low-level robot action trajectory command. That is, $\tau=g(z) \sim p(\cdot|z)$ and $p(I^{stroke}|z)$ may be used to build a canvas image transition model with a blending model if necessary. A plan may be successfully executed in the real world through mapping g that directly plans and learns a painting task in the skill space $\mathcal{Z}$ by executing an SBR algorithm.

Hereinafter, a method of learning the robotic painting skill and using the same to plan a robotic painting task on an actual digital canvas is described.

Figure 12:
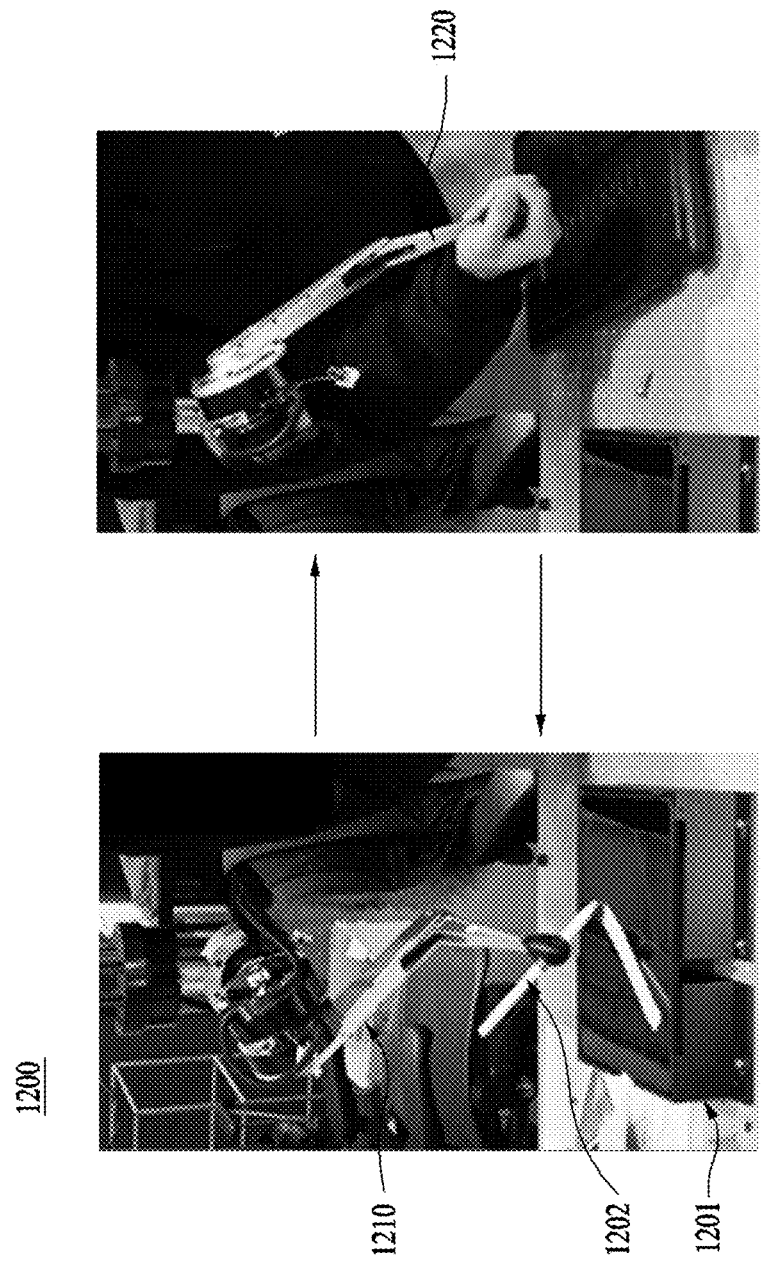
FIG. 12 illustrates an example of a process of collecting offline action data, according to some example embodiments.

FIG. 12 illustrates an example of a process of collecting offline action data according to some example embodiments.

Referring to FIG. 12, the data collection unit 210 may use an interactive remote control system 1200 to control a wide range of forcibly controlled manipulation actions for offline skill learning. A set of two proprioceptive torque-controlled robots, master and slave, (1210 and 1220) is synchronized using low latency and high-strength impedance control such that an operator may transmit a motion command and also adjust a force through a master device due to physical force/haptic feedback. The operator may directly demonstrate all of physical force and positional command that constitute a natural, agile, and skillful contact-rich manipulative action for the painting robot (e.g., master) 1210.

The left drawing of FIG. 12 shows an example of hardware settings of a robotic painting system to which the 4-DoF torque controlled painting robot 1210 and a digital canvas 1201 are mounted.

The operator may continuously demonstrate an action for painting in stroke level using the haptic support remote control device (slave) 1220 and the painting robot (master) 1210 may collect stroke-level action data while playing the action demonstrated by the haptic support remote control device 1220.

The low-inertia 4-DOF torque-controllable painting robot 1210 performs a painting task on the digital canvas 1201 using a digital painting tool 1202 attached to an end effector. Physical interaction information between the digital canvas 1201 and the painting tool 1202 may be rendered on a screen. A contact position, angle, pressure, and time according to a stroke path are included in pencil kit (PK) point information. A method of converting PK point information is determined to change a rule for shape, local opacity, width, style, and color blending of a rendered stroke image according to various tool types, such as a pen, a marker, and a pencil, in addition to the pencil-type painting tool 1202. Average color, opacity, and width information may be preset before stroke demonstration.

The interactive remote control system 1200 may set a stroke color before commanding the robot to execute a physical painting task using HTTP server communication with the digital canvas 1201.

The interactive remote control system 1200 collects human demonstrations that involve high impact and agile contact control strategies and realizes a wide range of painting strokes. The kinematically identical master robot (12-DOF painting robot) 1210 and slave robot (12-DOF haptic device) are bi-directionally synchronized with a position-speed impedance controller of a joint space using the same scaling rule. For each stroke demonstration, a robot's joint state action trajectory $\tau^{robot} \in \mathbb{R}^{T_i \times n}$ and a rendering outcome $I^{stroke} \in \mathbb{R}^{1 \times W \times H}$ and a PK point trajectory $\tau^{PK}$ of its single channel stroke image are collected as a pair.

$$\mathcal{D} = \{(I^{stroke}, \tau^{robot}, \tau^{PK})_i \mid 1 \le i \le N\} \quad \text{[Equation 16]}$$

The example embodiment trains a generative model of RPS (Equation 15) by using the PK point trajectory $\tau^{PK}$ as explicit information bottleneck in the demonstration dataset $\mathcal{D}$.

A latent variable model as in Equation 17 is assumed.

$$p(\tau^{robot}, I^{stroke}) = \mathbb{E}_{z \sim p_z(\cdot)}[p(\tau^{robot} \mid \tau^{PK}(z)) p(I^{stroke} \mid \tau^{PK}(z))] \quad \text{[Equation 17]}$$

Here, 1) a simple and uniform prior $p_z(z)$ is used to find a soft inverting expression $\tau^{PK}(z)$ through a deep flow-based model, 2) a deterministic model $I^{stroke} = h^{STN}(\tau^{PK})$ is assumed to decode a stroke image, and 3) a conditional generative model $p(\tau^{robot} \mid \tau^{PK})$ is trained to consider a multimodal action trajectory adjusted according to the same contact information.

A preprocessing stage and network modeling specifications are further described below.

Initially, data distribution $p(\tau^{PK}(z))$ with compact latent representation $z \in \mathcal{Z} = (-1, 1)^{\dim(\mathcal{Z})}$ is learned using a flow-based generative model. As the preprocessing stage, a speed of a stroke motion is encoded by sampling a variable-length sequence $\tau^{PK}$ to a small fixed-size sequence and by adding a stroke horizon.

$$\tau^{PK} \leftarrow [\tau_0^{PK}, \tau_{\Delta T/2}^{PK}, \tau_{\Delta T}^{PK}, \Delta T] \in \mathbb{R}^{13} \quad \text{[Equation 18]}$$

By applying a series of parameterized inversion transformation $f_i$ that map data points $\tau^{PK}$ to a uniformly distributed latent space $z \sim \pi_z(\cdot) = \text{Uniform}(-1, 1)^{13}$, the model directly learns the data distribution $p_\theta(\tau^{PK})$ with the maximum likelihood goal.

$$\mathcal{L}_{ML}(\theta) = \frac{1}{|\mathcal{D}|} \sum_{\tau^{PK} \sim \mathcal{D}} \log p_\theta(\tau^{PK}) \quad \text{[Equation 19]}$$

$$\tau^{PK} = f_\theta(z) = f_K \circ f_{K-1} \circ \ldots \circ f_1(z) \quad \text{[Equation 20]}$$

$$\log p_\theta(\tau^{PK}) = \log \pi_z(z) - \sum_{i=1}^{K} \log \left| \det \frac{df_i}{dz_{i-1}} \right| \quad \text{[Equation 21]}$$

Likelihood estimation may be performed for a sample generated through this, using Equation 21. This may be regarded as effective out-of-distribution measure required for a safe and reliable robot task.

To plan a painting skill sequence, log likelihood measure is explicitly adopted from limited optimization formulation.

A conditional variational autoencoder (cVAE) architecture is used to generate a multimodal distribution of robot action trajectories adjusted according to a feasible stroke. That is, a cVAE model is trained for data distribution of PK points, that is, $p^{CVAE}(\tau^{robot} \mid \tau^{PK}) \tau^{PK} \sim \mathcal{D}$. Before learning, a state action trajectory $\tau^{robot} \in \mathcal{D}$ is passed through preprocessing unit T.

$$T: \mathbb{R}^{T_i \times n} \to \mathbb{R}^{T_{max} \times (n+1)} \quad \text{[Equation 22]}$$

This converts a variable-length sequence to a fixed length sequence $T(\tau^{robot}) = \tau_{resized}^{robot}$ that is resized for easy learning. The sequence size is adjusted to a fixed length $T_{max}$ through linear interpolation between sample points. To preserve original length information, $T_i$ is added to the resized vector $\tau_{resized}^{robot}$. Inverse mapping from $\tau_{resized}^{robot}$ to $\tau^{robot}$ is simple and is represented as $$T^{-1}: \mathbb{R}^{T_{max} \times (n+1)} \to \mathbb{R}^{T_i \times n}.$$

After the preprocessing stage, a conditional model $p(\tau^{robot}|\tau^{PK})$ is trained by minimizing an objective function evidence lower bound (ELBO) goal.

$$\mathcal{L}(\psi) = -KL\left[p_\psi\left(\eta \mid \tau^{robot}_{resized}, \tau^{PK}\right) \| p_\psi\left(\eta \mid \tau^{PK}\right)\right] + \quad \text{[Equation 23]}$$
$$\mathbb{E}_{(\tau, p) \in \mathcal{D}}\left[\log p_\psi\left(\tau^{robot}_{resized} \mid \tau^{PK}, \eta\right)\right]$$

A deterministic stroke rendering model $h^{STN}$ that maps a PK point trajectory to a single-channel image of individual stroke is trained.

$$h^{STN}: \tau^{PK} \to I^{stroke} \in \mathbb{R}^{1 \times W \times H} \quad \text{[Equation 24]}$$

To effectively cope with a spatial change in image feature, a differentiable affine transform network module may be used. A network is designed to separately predict a position/scale invariable form of a stroke $I_{crop}^{stroke}$ with affine transform matrix $M \in \mathbb{R}^{2 \times 3}$ required to warp a predicted stroke shape to an original scale and a position of canvas coordinates.

To rearrange the original dataset to $\mathcal{D}_{affine}$ and to reconvert a cropped and resized stroke image $I_{crop}^{stroke}$ and stroke image $I_{crop}^{stroke}$ to an original size and position, corresponding affine transformation matrix M is included ($M \circ I_{crop}^{stroke} = I^{stroke}$).

$$\mathcal{D}_{affine} = \left\{\left(I_{crop}^{stroke}, M, \tau^{robot}, \tau^{PK}\right)_i \mid 1 \leq i \leq N\right\} \quad \text{[Equation 25]}$$

Then, a stroke rendering model $h^{STN}$ is trained to minimize a weighted squared error loss of a predicted affine transformation and position/scale invariant stroke shape image.

$$\mathcal{L} = \mathbb{E}_{\mathcal{D}_{affine}}\left[\|M - \hat{M}\|_2^2 + \alpha\|I_{crop}^{stroke} - \hat{I}_{crop}^{stroke}\|_2^2\right] \quad \text{[Equation 26]}$$
$$\text{s.t.} \left(\hat{M}, \hat{I}_{crop}^{stroke}\right) = h^{STN}\left(\tau^{PK}\right)$$

Here, $\alpha = 10^3$ is used. A spatial transformer network-based architecture may be used to interpolate features of image coordinates associated with input points. In some other example embodiments, a convolutional neural network (CNN) type image decoder may be used.

Accurately modeling complex dynamics underlying a real-world painting environment may be required to reduce a gap between simulated painting on a screen and real-world robotic painting. Therefore, a canvas image transition model f may approximate a state transition occurring on a canvas plane according to RPS $z \in \mathcal{Z}$ and color $C \in \mathbb{R}^3$ of canvas state $I_t^{canvas}$.

$$f: I_t^{canvas} \times z \times c \to I_{t+1}^{canvas} \in \mathbb{R}^{3 \times W \times H} \quad \text{[Equation 27]}$$

In this aspect, the stroke rendering model $h^{STN}$ may be interpreted in a specific form of the canvas image transition model that renders a stroke on a blank canvas in which background $I_t^{canvas} = O$ is white $c = 1^3$.

$$h^{STN}\left(\tau^{PK}(z)\right) \approx I^{stroke}\left(\tau^{PK}(z)\right) = f(O, z, 1^3) \quad \text{[Equation 28]}$$

Therefore, rendering a colored stroke on the blank canvas is simple. A predicted single channel stroke image $h^{STN}(z)$ may be expanded to a three-channel RGC color spacy by multiplying color C to the original grayscale color space. This may be defined as operation $\mathcal{T}_{color}: \mathbb{R}^{1 \times W \times H} \to \mathbb{R}^{3 \times W \times H}$ $$f(O, z, c) = \mathcal{T}_{color}\left(h^{STN}(z); c\right) \quad \text{[Equation 29]}$$

On the other hand, mixing the stroke f(O,z,c) on the blank canvas, that is, $f(I_t^{canvas}, z, c)$ may not be universally modeled for all painting environments. For example, in the case of acrylic color paint, the state transition model may be modeled as follows.

$$I_{t+1}^{canvas} = f(I_t^{canvas}, z, c) \quad \text{[Equation 30]}$$
$$= I^\alpha \cdot f(O, z, c) + (1 - I^\alpha) \cdot I_t^{canvas}$$

Here, $I^\alpha$ denotes a binary mask for a stroke shape rendered using $h^{STN}$. Also, a digital pen-type painting tool also follows the image transition model (Equation 30) in which a latest stroke overlaps a former stroke. However, the canvas image transition model is challenging to acquire for other color paints, such as watercolor or marker paint. In this case, the color blending model $f_c: \mathbb{R}^3 \times \mathbb{R}^3 \to \mathbb{R}^3$ that operates on a pixel-level operation may be directly trained.

$$I_{t+1}^{canvas} = f(I_t^{canvas}, z, c) \quad \text{[Equation 31]}$$
$$= f_c(I_t^{canvas}, f(O, z, c))$$

Also, a stochastic model may be more suitable for modeling color blending of physical paint rather than a deterministic model.

In an RPS-trajectory optimization stage, a trajectory optimization is directly implemented in an RPS space to infer a high-level decision-making portion, that is, a color stroke sequence that minimizes proximity of a canvas image over a desired target image in painting.

$$\min_{(z,c)_{0:N-1}} \sum_{t=1}^{N} \|I_t^{canvas} - I^{target}\|^2 \quad \text{[Equation 32]}$$
$$\text{s.t.} \quad I_{t+1}^{canvas} = f(I_t^{canvas}, z_t, c_t)$$
$$\sum_{t=1}^{N} \log p_\theta(f_\theta(z_t)) \geq C$$

Here, the first constraint indicates painting dynamics, and the second constraint lowers an (estimated) mean log likelihood of RPS to penalize generation of out-of-distribution samples. An appropriate value of C is adjusted according to the measure of data log likelihood loss (Equation 19).

In the example embodiment, constraints and objective functions are distinguished. This allows a local minimum solution to be reliably found using a gradient-based optimization toolbox. In some instances, the solution may converge to a better local minimum value using a sampling-based greedy search and a gradient-based optimization.

Other model-based policy/trajectory optimization methods, for example, RL, model predictive control, and other SBR algorithms, may be used to find optimal planning in the RPS space.

Figure 13:
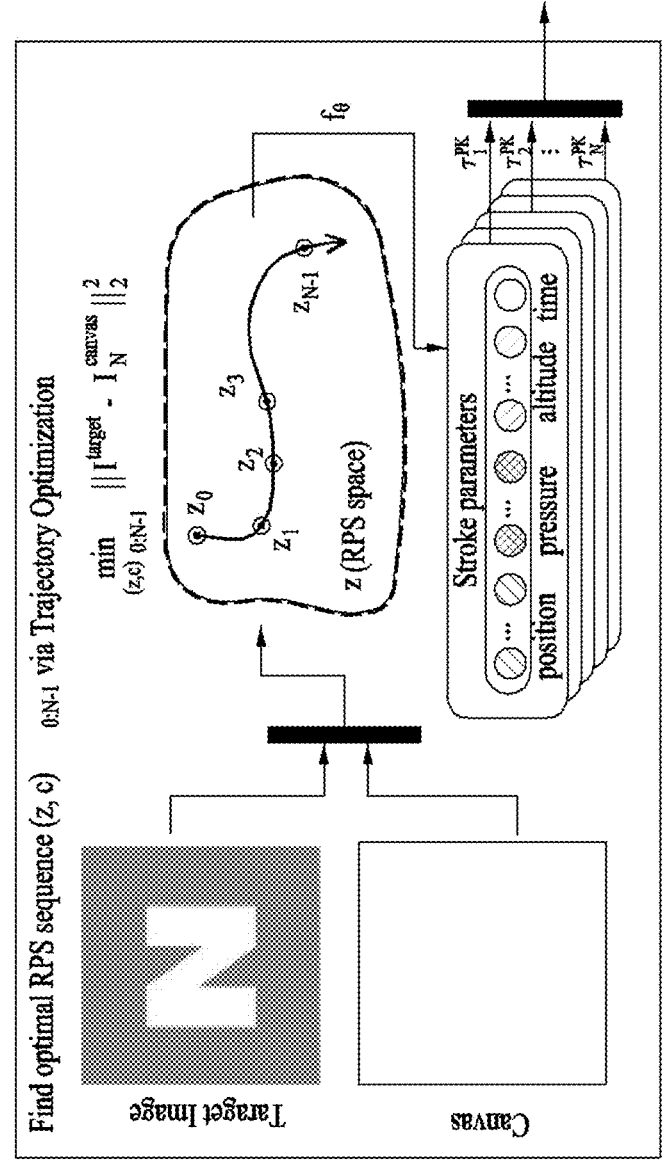
FIGS. 13, 14, and 15 illustrate robotic painting workflow, according to some example embodiments.
Figure 14:
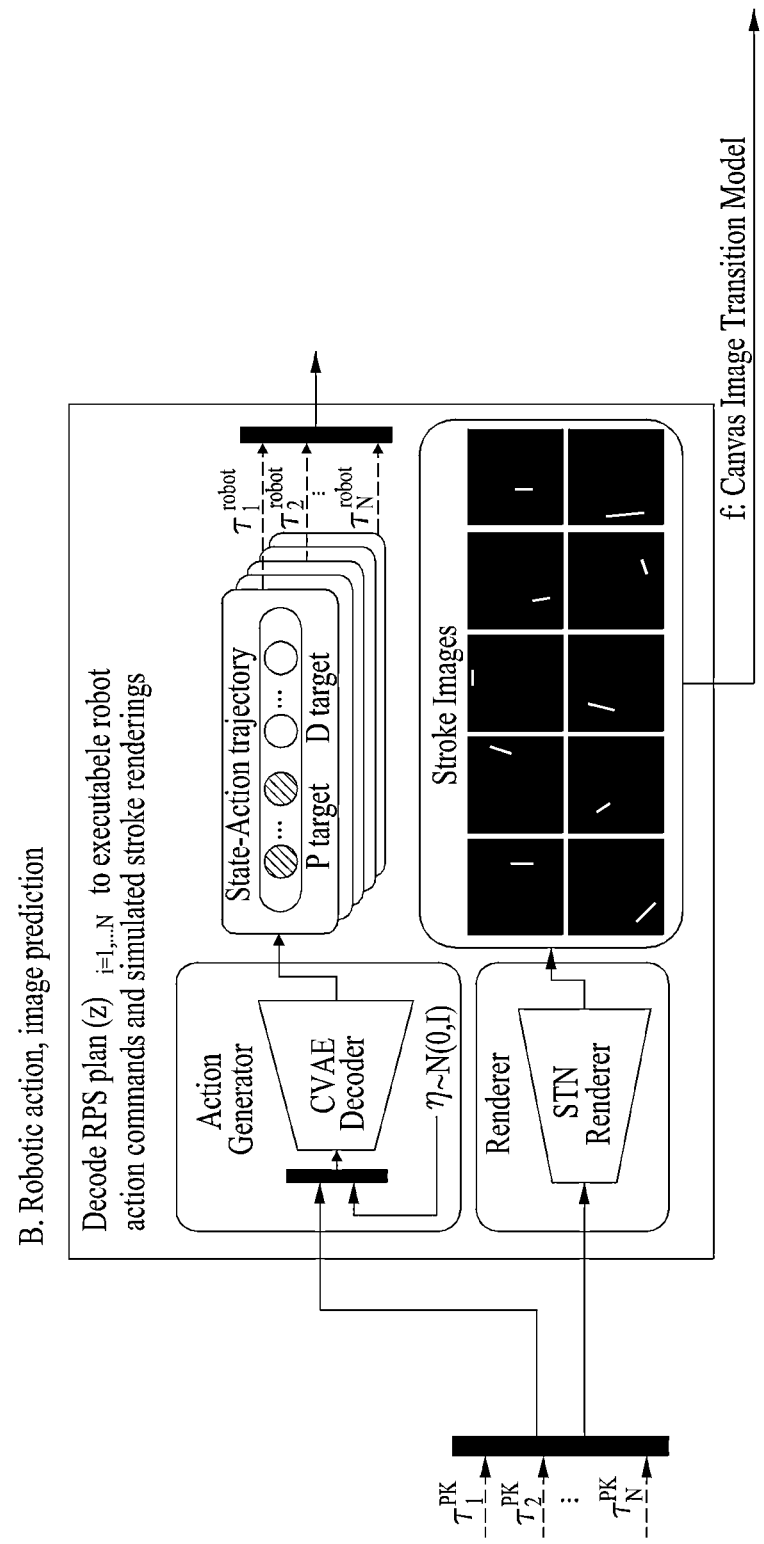
Figure 15:
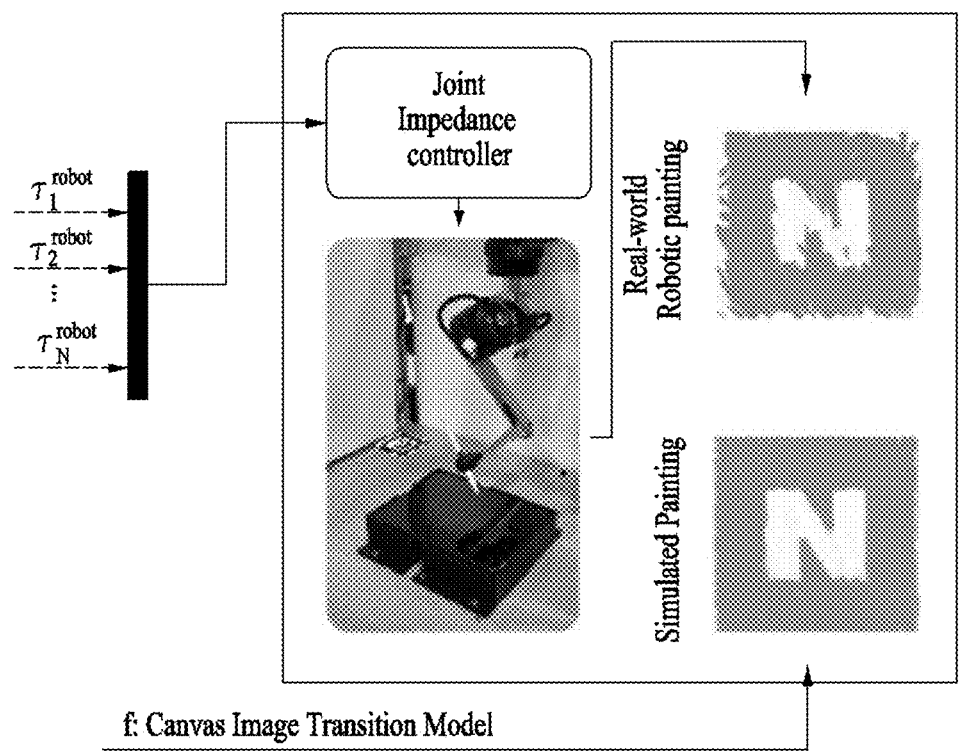

FIGS. 13 to 15 illustrate overall robotic painting workflow according to some example embodiments.

FIG. 13 illustrates a process of predicting a stroke parameter, and the processor 120 may find an optimal RPS sequence $(z,c)_{0:N-1}$ that minimizes a difference of a canvas image for a target image through trajectory optimization.

FIG. 14 illustrates a process of predicting a robot action and an outcome stroke image, and the processor 120 may decode a stroke parameter RPS plan (z)i=1, ..., N to executable robot action commands and simulated stroke renderings.

FIG. 15 illustrates a process of executing robotic painting, and the processor 120 may perform a painting task on a target image using robot joint impedance controller using a predicted robot state action trajectory $\tau^{robot}$. Here, robotic painting may be performed by rendering strokes of the robot in a simulation image according to the canvas image transition model f and by blending colors.

For example, when the optimal RPS sequence $(z,c)_{0:N-1}$ computed through limited trajectory optimization is given, the processor 120 allows the robot to transition to an initial state $s_1(z_t^*)$, to execute a sampled action command $a_{1:T}(z_t^*)$ from a cVAE model $(s_{1:T}(z_t^*), a_{1:T}(z_t^*)) \sim p_\psi(\tau^{robot}|f_\theta(z_t^*))$, and to sequentially select color $c_t^*$ and then execute a stroke $z_t^*$.

According to some example embodiments, it may be possible to reduce (or minimize) data collection cost for robot skill learning by using unlabeled action data for robot skill learning. In addition, according to some example embodiments, it is possible to more effectively and safely build a robot skill model by learning and planning reusable and predictable robot skills from offline action data that involves complex interaction with various external environments.

According to some example embodiments, a work space control may be performed such that the robot may accurately track pixel points on the canvas extracted from a rendered stroke image $I^{stoke}(z)$ for the RPS $z \in \mathcal{Z}$. Here, using data-based approach, a difference between a desired image and the target image may be reduced. According to some example embodiments, it is possible to learn more various painting skills in the RPS space $\mathcal{Z}$ through human demonstration, to draw a more expressive work using various RPSs through a sequential decision-making module, and to reduce a gap between simulated robotic painting and real-world robotic painting through mapping $p(\tau^{robot}|\tau^{PK})$, $\tau^{PK}=f_\theta(z)$ that transforms the RPS to executable robot actions.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The apparatuses described above may be implemented using hardware components, software components, and/or combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For sake of discussion, the description may refer to using a single processing device; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. Here, the media may store computer-executable programs for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A robotic painting method performed by a computer system, wherein the computer system comprises at least one processor configured to execute computer-readable instructions included in a memory, and
the robotic painting method comprises:
collecting, by the at least one processor, stroke-level action data for a painting action;
learning, by the at least one processor, a stroke-level robotic painting skill using the stroke-level action data, wherein the learning includes training a deep latent variable model using the stroke-level action data; and
performing, by the at least one processor, a painting task for a given target image based on a prediction using the deep latent variable model.

2. The robotic painting method of claim 1, wherein the collecting comprises collecting the stroke-level action data by operating a robot based on a physical force and a position command that constitute a stroke-level action using a haptic device.

3. The robotic painting method of claim 1, wherein the collecting comprises collecting forcefully controlled action data of a master robot synchronized with a slave robot as an unlabeled offline dataset according to a stroke demonstration using the slave robot.

4. The robotic painting method of claim 1, wherein a unit skill for robotic painting includes an initial robot state, a stroke action trajectory, and an outcome stroke image.

5. The robotic painting method of claim 1, wherein the learning comprises training a robot skill model that includes action sequence performance ability and outcome state prediction ability using the stroke-level action data.

6. The robotic painting method of claim 1, wherein the learning comprises training a stroke-level image transition model using the stroke-level action data.

7. The robotic painting method of claim 6, wherein the stroke-level image transition model is configured using an outcome stroke image model and a pixel-level color blending model.

8. The robotic painting method of claim 6, wherein the learning further comprises planning a painting skill sequence with a stroke-level skill combination through gradient-based trajectory optimization.

9. The robotic painting method of claim 8, wherein the planning comprises performing trajectory optimization according to constraints on painting dynamics and mean log likelihood and an objective function that minimizes a difference between a current canvas image and the given target image.

10. The robotic painting method of claim 1, wherein the learning comprises training the deep latent variable model that encodes a state-action trajectory and an outcome stroke image each with a variable length using the stroke-level action data.

11. The robotic painting method of claim 10, wherein the robotic painting method further comprises performing, by the at least one processor, the painting task for the given target image based on the state-action trajectory and the outcome stroke image predicted through the deep latent variable model.

12. A non-transitory computer-readable recording medium storing instructions that, when executed by the at least one processor, cause the at least one processor to perform the robotic painting method of claim 1.

13. A computer system comprising:
at least one processor configured to execute computer-readable instructions stored in a memory,
wherein the computer-readable instructions configure the at least one processor to:
collect stroke-level action date for a painting action;
learn a stroke-level robotic painting skill using the stroke-level action data, wherein the at least one processor is further configured to train a deep latent variable model using the stroke-level action data; and
control a master robot to perform a painting task for a given target image based on a prediction obtained using the deep latent variable model.

14. The computer system of claim 13, wherein the at least one processor is further configured to collect forcefully controlled action data of the master robot synchronized with a slave robot as an unlabeled offline dataset according to a stroke demonstration using a haptic-based slave robot.

15. The computer system of claim 13, wherein a unit skill for robotic painting includes an initial robot state, a stroke action trajectory, and an outcome stroke image.

16. The computer system of claim 13, wherein the at least one processor is further configured to train a stroke-level image transition model using the stroke-level action data.

17. The computer system of claim 16, wherein the at least one processor is further configured to configure the stroke-level image transition model through an outcome stroke image model and a pixel-level color blending model.

18. The computer system of claim 16, wherein the at least one processor is further configured to plan a painting skill sequence with a stroke-level skill combination through gradient-based trajectory optimization.

19. The computer system of claim 13, wherein the at least one processor is further configured to train the deep latent variable model that encodes a state-action trajectory and an outcome stroke image each with a variable length using the stroke-level action data.

20. The computer system of claim 19, wherein the at least one processor is further configured to control the master robot to perform the painting task for the given target image based on the state-action trajectory and the outcome stroke image predicted using the deep latent variable model.

* * * * *